United States Patent

[11] 3,552,687

| [72] | Inventors | Ronald W. Howard;<br>Roy Atkin; Geoffrey S. Bishop, London,<br>England |
|---|---|---|
| [21] | Appl. No. | 682,762 |
| [22] | Filed | Nov. 14, 1967 |
| [45] | Patented | Jan. 5, 1971 |
| [73] | Assignee | Elliott Brothers (London) Limited<br>London, England<br>a British company |
| [32] | Priority | Nov. 17, 1966 |
| [33] | | Great Britain |
| [31] | | No. 51528/66 |

[54] AIRCRAFT ALIGNMENT SYSTEMS
17 Claims, 2 Drawing Figs.

[52] U.S. Cl. .................................................. 244/77,
343/108
[51] Int. Cl. ........................................... B64c 13/18
[50] Field of Search ............................................ 343/108;
244/77A, 77M

[56] References Cited

UNITED STATES PATENTS

| 3,071,336 | 1/1963 | Fearnside .................. | 244/77(M) |
| 3,072,369 | 1/1963 | Alderson ..................... | 244/77(A) |
| 3,120,934 | 2/1964 | Robertson ................... | 244/77(A) |
| 3,136,502 | 6/1964 | Auld et al. .................. | 244/77(A) |
| 3,425,649 | 2/1969 | Colwell ....................... | 244/77(M) |

*Primary Examiner*—Milton Buchler
*Assistant Examiner*—Jeffrey L. Forman
*Attorney*—Imirie and Smiley ABSTRACT: The present invention is directed to providing at the output of a control integrator by the use of a yaw-rate gyro, a course deviation indicator (course deviation being the difference between runway heading and aircraft heading) and a feedback arrangement, a signal at the start of a terminal stage of landing, which accurately represents the course deviation, if any, then existing, and thereafter with the feedback arrangement inoperative, varying the output signal of the control integrator according to the output signal of the yaw rate gyro until a suitable kickoff or decrab altitude is reached. The feedback arrangement may be between the output and the input of the control gyro or between the output and the input of a means for synchronizing the control integrator to eliminate from the output signal thereof any component due to rate-gyro offset. In the first case, the feedback arrangement consists of a circuit providing a differentiator receiving an output signal from the course deviation indicator and the output signal of the control integrator, a feedback integrator receiving the differentiator output signal via a switch by means of which the feedback circuit can be disabled, and feeding its output signal to the control integrator which also receives the output signal of the yaw-rate gyro. When the feedback circuit is operative i.e. up to the start of the terminal stage, the differentiator serves to produce a differential signal if any undue variation occurs between the course deviation signal and the output signal of the control integrator, which differential signal is fed to the input of the control integrator so that the output signal thereof is slaved to the course deviation signal. In the second case, the synchronising means comprises an amplifier receiving the output signal of the yaw-rate gyro and producing a signal which is fed to the input of the control integrator which also receives the output signal of the course deviation indicator. The feedback arrangement comprises a feedback integrator and a switch by means of which the feedback arrangement can be disabled at the start of the terminal stage of the landing phase.

PATENTED JAN 5 1971 3,552,687

INVENTORS
Ronald W. Howard,
Roy Atkin &
Geoffrey S. Bishop
By

AIRCRAFT ALIGNMENT SYSTEMS

This invention relates to an aircraft control system for providing a signal the magnitude of which is a function of deviation (hereinbelow referred to as "course deviation") between aircraft and runway headings, and for controlling, by means of said signal, a control surface of the aircraft so that when, during the terminal stage of an aircraft landing phase, the aircraft is at a given altitude, a "decrab" or "kickoff drift" operation may be performed to correct any such deviation in order to align the aircraft landing wheels with the direction of motion of the aircraft over the runway. By so aligning the landing wheels, sideloads on the undercarriage, at touchdown, are reduced.

According to the invention there is provided an aircraft control system which comprises: means operable to produce a signal indicative of aircraft yaw rate; an integrator (hereinbelow referred to as the control integrator) to receive the latter signal and to produce an output signal for indicating deviation of the aircraft from a given heading; and further means operable to ensure that, at the commencement of a terminal stage of the landing phase, the control integrator output signal is indicative of any deviation from said heading then existing.

Preferably the means operable to produce the yaw rate signal comprises a rate gyro; the rate gyro may have a self-monitoring facility.

The further means may include a feedback circuit which (1) is connected between the output and input of the control integrator, (2) is adapted to receive an input signal indicative of the deviation, if any, from the given heading and operative to slave the control integrator output so as to cause the output signal of the control integrator to follow any variation in said input signal, and (3) includes switch means operable to disable the feedback circuit at the commencement of the terminal stage of the landing phase, so that, thereafter, the control integrator derives said output signal solely from the signal indicative of aircraft yaw rate.

The feedback circuit may comprise differential means to receive an input signal indicative of course deviation and an output signal from the control integrator and operative to produce a signal indicative of any difference between the input signals to the differential means; and a feedback integrator, connected on closure of the switch means between the output of a differential means and the input of the control integrator so that with the feedback integrator so connected any difference signal produced by the differential means is fed via the feedback integrator to the input of the control integrator to cause the output thereof to be slaved to said input signal indicative of the deviation, if any, from the given heading. The feedback circuit may further comprise amplifier means which is connected in parallel with the feedback integrator and which ensures that the output of the control integrator is nonoscillatory.

The further means may alternatively comprise: means operable prior to the commencement of the terminal stage to synchronize the control integrator so as to eliminate from the control integrator output signal any signal due to rate gyro offset so that when any signal representing deviation of the aircraft from the given heading is fed to the control integrator at the commencement of the terminal phase of landing, the output signal from the control integrator represents the deviation then existing.

The means operable to synchronize the control integrator may comprise amplifier means connected between the rate gyro and the control integrator; and a feedback circuit connected between the output and input of the amplifier means and including further integrator means and switch means operable so that the feedback circuit may be opened at the commencement of the terminal stage of the landing phase.

There may be means for monitoring the output of the control integrator.

Where the control integrator itself is provided with the feedback circuit as above described, the control integrator monitoring means may comprise: a monitoring integrator adapted to receive the yaw rate signal and connected to the output of the control integrator so as, prior to the commencement of the terminal stage, to slave the output of the monitoring integrator to the output of the control integrator; and a comparator controlled by the outputs of the control and monitoring integrators, after the commencement of the terminal stage, so that, in the event that the two integrator output signals differ by more than a predetermined amount, an alarm signal is developed by the comparator.

Where the further means takes the alternative form described above the monitoring means may comprise a monitoring integrator which receives an output signal from said synchronizing means so as to produce a like output signal to the control integrator, and a comparator adapted to be controlled by the outputs of the control and monitoring integrators so as to develop an alarm signal in the event that the two integrator output signals differ by more than a predetermined amount.

The course deviation signal may be received from a course deviation indicator carried by the aircraft; and the signal indicative of the aircraft heading signal may be supplied to the course deviation indicator from a compass provided with means for deriving the heading signal therefrom, carried by the aircraft. The course deviation indicator may be manually settable so as to receive an input signal indicative of runway heading.

A system of the present invention may be provided in duplicate with two course deviation indicators and the outputs of the course deviation indicators may be connected to a comparator operative, in the event that the output signals on the course deviation indicators differ by more than a predetermined amount, to develop an alarm signal.

Each of the course deviation indicators may be adapted to receive signals indicative of aircraft heading from each of two compasses carried by the aircraft.

A "decrab" circuit may be provided responsive to a signal derived from the control integrator and to a signal indicating the attainment of "decrab" altitude, to control an aircraft control surface or surfaces so as to bring the aircraft landing wheels into alignment with the direction of aircraft movement over the runway. The output of the control integrator may, however, alternatively or additionally be supplied to a display device so that the control of the aircraft control surface or surfaces, at "decrab" altitude, may be left to the pilot of the aircraft.

Two embodiments of the invention are hereinafter described by way of example with reference to FIGS. 1 and 2 respectively of the accompanying drawings.

Figure 1:
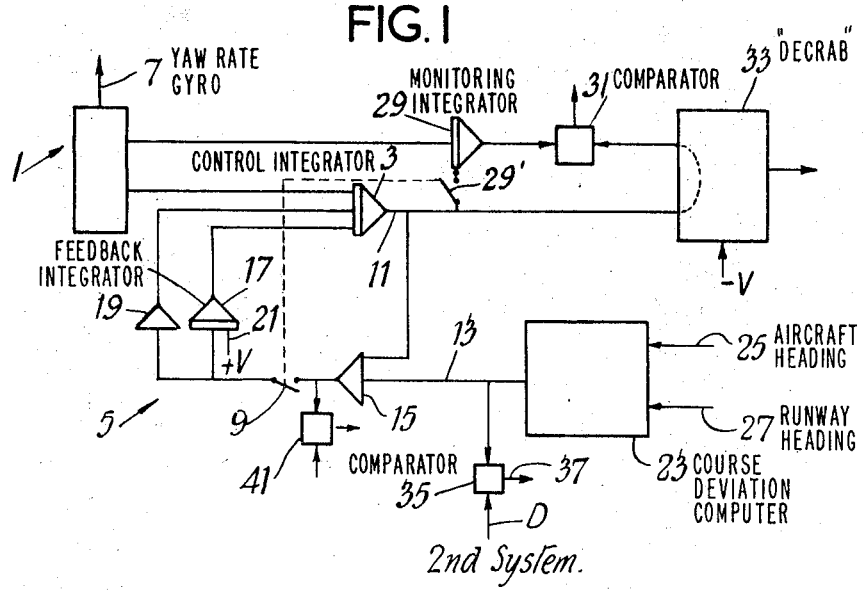
FIG. 1 is a block diagram of the apparatus of an aircraft alignment system according to the invention.

An aircraft has a system which comprises (FIG. 1): means 1 operable to produce an output signal indicative of aircraft yaw rate; an integrator 3 constituting the control integrator referred to hereinabove and receiving the latter signal; means 5 operable to ensure that, at the commencement of a terminal stage of the aircraft landing phase, the output of the integrator 3 is indicative of any course deviation then existing.

The means 1 comprises a rate gyro, in particular a self-monitored rate gyro, adapted, in the event of a gyro malfunction to develop an alarm signal on an output 7. Detailed description of a self-monitored gyro suitable for use in performing the present invention, is given in U.S. Pat. No. 3,377,872.

The means 5 comprises a feedback circuit which includes a switch 9 and which is operative when the switch 9 is closed to control the integrator 3 so that the voltage standing on the integrator output 11 becomes equal in magnitude to a voltage, indicative of any course deviation, applied to the feedback circuit from an input 13. The last-mentioned voltage may be made subject to a constant bias, further referred to below, which may be introduced into the feedback circuit for the purpose of monitoring the feedback circuit.

The feedback circuit includes differential means, in the form of a summing amplifier 15, adapted to develop an output voltage indicative of any difference between the output voltage from the integrator 3 and the course deviation signal on input 13; an integrator 17; and an amplifier 19 connected in parallel with the integrator 17. The switch 9 is operable to complete and to disconnect the feedback circuit as required during operation of the system.

The constant bias, referred to above, is applied to an input 21 of the integrator 17. The bias may have a magnitude of say one volt.

The amplifier 19 is chosen to ensure that the output of integrator 3 is nonoscillatory.

The course deviation signal supplied to the input 13 of the summing amplifier 15, is derived from a course deviation indicator 23. The indicator 23 is adapted to receive, at input 25, an input signal representing aircraft heading, and, at input 27, an input signal representing runway heading.

To monitor the integrator 3 there is a further integrator 29. The latter integrator is connected to the output of the rate gyro 1 and is connectable to the output 11 of the integrator 3 so as to slave the output of the integrator 29 to the output of integrator 3. For this purpose, the output of the integrator 3 is shown connected to the integrator 29 through the switch 29' which, as indicated by the dashed line, operates in consonance with the switch 9.

The output of the integrator 29 is connected to one input of a comparator 31 which has a second input connected to the output of the integrator 3. The latter output is also supplied to a "decrab" circuit 33.

The above-described system is provided with a duplicate (not shown) including a second course deviation indicator.

The output of the course deviation indicator 23 and the output D of the duplicate indicator are connected to the inputs of comparator 35. In the event that the voltages present on the course deviation indicator outputs differ by more than a predetermined amount the comparator develops an alarm signal on its output 37.

During the landing phase of the runway approach, when the aircraft is at an altitude $h_1$, which may conveniently be an altitude between 500 feet and 1,000 feet, say 800 feet, the switch 9 is closed. As a result, the output voltage from the integrator 3 becomes slaved, by the action of the feedback circuit so as to follow any variations in the course deviation signal supplied by the course deviation indicator to the input 13 of the summing amplifier 15.

At the time at which the switch 9 is closed, the integrator 29 is connected to the output of the integrator 3 so that the output voltage of the integrator 29 becomes slaved to that of the integrator 3.

At a height $h_2$ equal to say 150 feet, the switch 9 is opened and, from this instant, the signal from integrator 3 is employed, independently of the course deviation indicator 23, to indicate any course deviation. At the time when the switch 9 is opened, the connection between the output of the integrator 3 and the input of the integrator 29 is broken so that, from this time the comparator 31 is effective to compare the outputs from the integrators 3 and 29.

At a "decrab" altitude of, say, 20 feet above the runway a signal, derived from a radio altimeter (not shown) carried by the aircraft, permits the "decrab" circuit to actuate a rudder and aileron control arrangement so as to produce relatively abrupt movement of the rudder and aileron. This produces a "decrab" movement of the aircraft such that the aircraft landing wheels are brought into alignment with the direction of motion of the aircraft over the runway, just prior to touchdown.

Any malfunction of the course deviation indicators during descent of the aircraft at the altitude $h_2$ is indicated by the comparator 35. Any such malfunction occurring after switch 9 has opened (at altitude $h_2$) is of no moment in the landing procedure; any deviation between aircraft and runway headings is stored by the integrator 3.

In the event of a failure in either of the integrators 3 and 29 during aircraft descent from altitude $h_2$ to the "decrab" altitude, the alarm signal produced by the comparator 31 enables the duplicate system to be employed during the remainder of the descent. The switch over from one system to the other is preferably effected automatically.

Should there be a fault in the feedback loop the bias (plus one volt) applied to the integrator 17 should appear at the output of the summing amplifier. An alarm circuit 41 connected in the output of the differential means detects such a condition and develops a signal which may be employed in switching over to the duplicate system.

Figure 2:
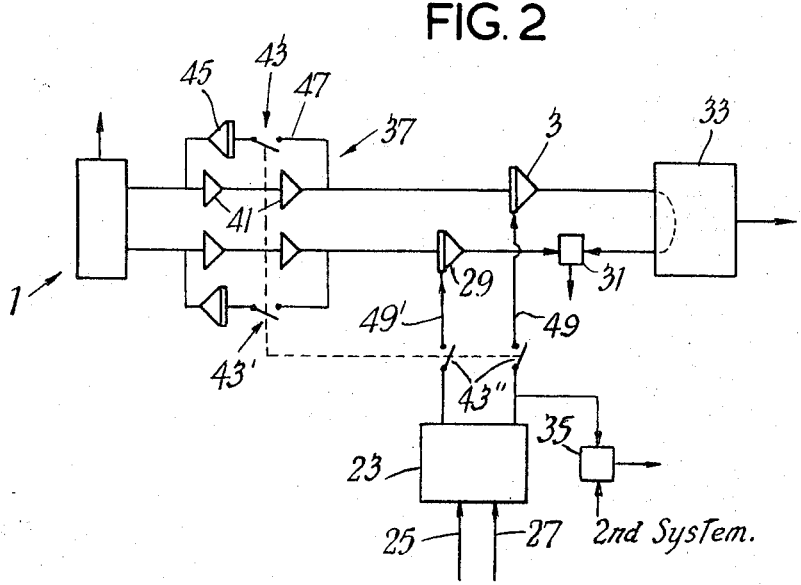
FIG. 2 is a block diagram of another embodiment of the invention.

Referring to FIG. 2, it will be seen that the alternative embodiment comprises, between the yaw rate gyro 1 and the integrator 3, means 37, operable prior to the commencement of the terminal stage, to synchronize the integrator 3 so as to eliminate from the integrator output any signal due to rate gyro offset.

As shown, the means 37 comprises amplifier means 41 connected between the rate gyro 1 and the integrator 3; and a feedback circuit 43 which is between the output and input of the amplifier means 41 and which includes further integrator means 45 and switch means 47 adapted to be closed prior to the commencement of the terminal stage so as to complete the feedback circuit 43. The course deviation indicator 23 provides an output to set the control integrator 3 output to an initial condition indicative of any course deviation existing at the commencement of the terminal stage.

In the arrangement of FIG. 2 the integrator 3 is monitored by a further integrator 29. The latter integrator 29 has means 43' similar to that employed for integrator 3, for eliminating any gyro offset signal from the output of the monitoring integrator; and the course deviation signals at 49 and 49' respectively are connected to the control integrator 3 and to the monitoring integrator 29 to set their outputs to represent any course deviation existing at the commencement of the terminal stage of the landing phase. As in the arrangement of FIG. 1 the outputs of the monitoring integrator 29 and the integrator 3 are compared by a comparator 31. The outputs of the course deviation computer 23 are connected through switches 43'' to the respective integrators 3 and 29 so that when switches 43'' are closed, in consonance with the switches 43 and 43' the outputs of the two integrators 3 and 29 are slaved to the output of the computer 23.

"Decrab" circuits, as 33, are well known. Their essential function is to store the signal developed at the output of an integrator 3. From the height $h_2$ down to the "decrab" altitude, the signal developed at the output of the integrator 3 may, of course, be continuously changing. At the attainment of the "decrab" altitude, as represented by the receipt of a signal from e.g., a radio altimeter, the course deviation information then set up in the "decrab" circuit is employed in the control of the rudder and ailerons of the aircraft so as to produce the desired "decrab" movement of the latter control surfaces.

We claim:

1. An aircraft control system comprising:

means operable to produce a signal indicative of aircraft yaw rate;

circuitry operable in response to signals representing aircraft heading and runway heading so as to develop a signal representing course deviation;

a control integrator having an input to which is applied the signal indicative of aircraft yaw rate; and means operable to interconnect the control integrator and the said circuitry and, when so interconnected, to slave the control integrator so that its output follows the course deviation signal and, at the commencement of the terminal stage of an aircraft landing maneuver, to disconnect the control integrator and the said circuitry so that, at such disconnection, the signal from the control integrator represents course deviation then existing, and, thereafter, varies only with the yaw rate signal.

2. A system according to claim 1, wherein the first-mentioned means comprise a yaw-rate gyro.

3. A system according to claim 2, wherein the last means comprises means operable prior to the commencement of the terminal stage of the landing phase to synchronize the control integrator so as to eliminate from the output signal thereof any signal due to rate gyro offset, so that when any signal representing deviation of the aircraft from the given heading is fed to the control integrator at the commencement of the terminal stage of landing, the output signal from the control integrator represents the deviation then existing.

4. A system according to claim 3, wherein said means to synchronize the control output signal comprise amplifier means connected between the rate gyro and the control integrator, and a feedback circuit connected between the output and the input of the amplifier means, comprising an integrator and a switch means operable so that the feedback circuit may be opened at the commencement of the terminal stage of the landing phase.

5. A system according to claim 4, wherein monitoring means are provided for monitoring the operation of the control integrator, comprising amplifier means with a feedback circuit as provided between the control integrator and the yaw-rate gyro in the system according to claim 4, a further integrator receiving as one input signal, an output signal from the monitoring amplifier means and as a further input signal, a signal indicative of deviation, if any, of the aircraft from the given heading, from said course deviation means, and a comparator receiving as one input signal, the output signal of the control integrator and as a further input signal, the output signal of the further integrator so that when the two input signals differ by more than a predetermined amount, the comparator produces an alarm signal.

6. A system according to claim 3, wherein means are provided for monitoring the operation of the control integrator.

7. A system according to claim 1, wherein a circuit is provided responsive to the output signal of the control integrator and to a signal indicating the attainment of a given altitude to effect the control movement of the aircraft to bring the aircraft into alignment with the given heading.

8. A system according to claim 1, wherein the last means comprise a feedback circuit which:
 1. is connected between the output and the input of the control integrator;
 2. is adapted to receive an input signal indicative of the deviation, if any, from the given heading, and operative to slave the output of the control integrator so as to cause the output signal of the control integrator to follow any variation in said input signal; and
 3. includes switch means to disable the feedback circuit at the commencement of the terminal stage of the landing phase so that after said commencement the control integrator derives said output signal solely from the signal indicative of aircraft yaw rate.

9. A system according to claim 8, wherein the feedback circuit comprises differential means to receive said input signal and the output signal of the control integrator to produce a signal indicative of any difference between the two signals received, and a feedback integrator connected on closure of said switch means, between the output of said differential means and the input of the control integrator so that with the feedback integrator so connected any difference signal produced by said differential means is fed via the feedback integrator to the input of the control integrator to cause the output signal thereof to be slaved to said input signal indicative of the deviation, if any, from the given heading.

10. A system according to claim 9, wherein the feedback circuit comprises amplifier means connected in parallel with the feedback integrator to ensure that the output of the control integrator is nonoscillatory.

11. A system according to claim 9, wherein the system is provided in duplicate and wherein the output signal of each feedback integrator is also fed to a comparator so that the comparator produces an alarm signal when the two input signals thereto differ by more than a predetermined amount.

12. A system according to claim 9, wherein means are provided for applying a bias voltage to the feedback integrator so that when no input signal is received thereby, the bias voltage appears at the output of the feedback integrator and is fed to the control integrator.

13. A system according to claim 1, wherein there are provided means for monitoring the operation of the control integrator.

14. A system according to claim 13, wherein the monitoring means comprise a further integrator receiving an input signal from said means operable to produce a signal indicative of aircraft yaw rate and from the control integrator to slave the output signal of the monitoring integrator to the output signal of the control integrator through means such that the output signal of the monitoring integrator is slaved only up to the commencement of the terminal stage of the landing phase, and a comparator receiving as one input signal, the output signal of the control integrator and as a further input signal, the output signal of the monitoring integrator so that the comparator produces an alarm signal if the two input signals thereto differ by more than a predetermined amount after the commencement of said terminal phase.

15. In an aircraft control system for producing a high integrity aircraft relative heading signal during the terminal stage of landing so as to allow accurate decrab movement of the aircraft just prior to touchdown, comprising in combination:
 yaw-sensitive means having an output proportional to aircraft yaw rate;
 a control integrator connected to the output of said yaw-sensitive means;
 reference means having an output proportional to the difference between aircraft heading and runway heading; and
 means operable only prior to the beginning of said terminal stage for forcing the output of said control integrator at the beginning of said terminal stage into conformity with a datum which is the output of said reference means at said beginning of the terminal stage whereby the instantaneous output of said control integrator during said terminal stage is the integral of aircraft yaw rate superimposed on said datum.

16. In the control system as defined in claim 15 wherein the last means comprises a feedback circuit in checking a difference amplifier having the outputs of said control integrator and said reference means as inputs thereto, a feedback integrator connected to the output of said difference amplifier and having its output connected as an input to said control integrator, and switch means for disabling said feedback circuit at the beginning of said terminal stage.

17. In the control system as defined in claim 15 wherein the last means includes amplifier means connected between said yaw-sensitive means and said control integrator, a feedback circuit connected between the output and input of said amplifier means and including an integrator and switch means for disabling said feedback circuit at the beginning of said terminal stage, and means for setting the output of said control integrator to the datum output of said reference means at the beginning of said terminal stage.